United States Patent Office 3,646,075
Patented Feb. 29, 1972

3,646,075
18-METHYL-1,4-ANDROSTADIENES AND PROCESS OF MAKING THE SAME
Hans-Detlef Berndt, Hermann Steinbeck, and Rudolf Wiechert, Berlin, Germany, assignors to Schering Aktiengesellschaft, Berlin, Germany
No Drawing. Filed July 24, 1969, Ser. No. 845,938
Claims priority, application Germany, July 27, 1968, P 17 93 055.1
Int. Cl. C07c 169/20
U.S. Cl. 260—397.4
5 Claims

ABSTRACT OF THE DISCLOSURE 18-methyl-1,4-androstadienes of the formula

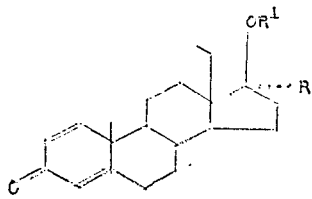

wherein R is a saturated or unsaturated hydrocarbon residue and $R^1$ is hydrogen or acyl.

The compounds are made by dehydrogenating the corresponding 1,2-saturated steroids followed by acylating a free 17-hydroxyl group or saponifying a 17-acyloxy group.

The compounds have a high ratio of the anabolic main action to the androgenic side action. They are useful wherever a build-up of the body albumin is desired, particularly in general debility conditions and during convalescence.

BACKGROUND OF THE INVENTION

Compounds of the androstane type which have an anabolic action are known. Particular examples which are available on the market are: 17β-hydroxy-17α-methyl-1,4-androstadiene-3-one and 17α-methyl-5α-androstano-(3,2-c)-1'H-pyrazol-17β-ol (Androstanazol). However, the androgenic action of these compounds is still undesirably high. This is frequently is disturbing factor when the compounds are administered to patients requiring anabolic treatment.

It is therefore an object of the present invention to provide for steroid compositions which have a desirable ratio between anabolic main action and androgenic side effects.

SUMMARY OF THE INVENTION

The invention comprises 18-methyl-1,4-androstadienes of the general formula

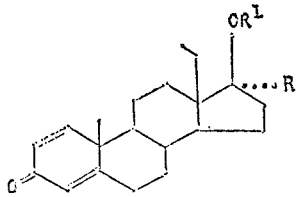

wherein R is a saturated or unsaturated hydrocarbon residue and $R^1$ is hydrogen or acyl.

The invention also embraces a method of making the above compounds by dehydrogenating 1,2-saturated steroids of corresponding structure followed by acylating a free 17-hydroxy group that may be present in the molecule or saponifying a 17-acyloxy group if such is present.

The invention also includes pharmaceutical compositions comprising the mentioned androstadienes as the effective agent together with a carrier material.

The invention furthermore relates to a method of treating patients with the pharmaceutical compositions by administration of a dose between 2 and 25 mg. per day.

DESCRIPTION OF THE PREFERRED EMBODIMENTS

Examples of the hydrocarbon radical that may be substituted in the 17α-position in the above molecule are methyl, ethyl, ethinyl and vinyl.

The acyl group represented by $R^1$ in the above formula may be derived from any acid as is customarily used in steroid chemistry for esterification purposes. Preferred are acyl residues of aliphatic carboxylic acids having 1–12 carbon atoms. The acids can be saturated or can also be unsaturated, branched or polycarboxylic acids or they may be substituted in the conventional manner for instance by hydroxyl or amino groups or halogen atoms. The acids may also be cycloaliphatic, aromatic, mixed aromatic-aliphatic or heterocyclic acids all of which can again be substituted.

Preferred acids for forming the acyl residue are for instance the following: acetic acid, propionic acid, enanthic acid, caproic acid, undecyclic acid, trimethylacetic acid, chloracetic acid, dichloroacetic acid, cyclopentylpropionic acid, phenylacetic acid, phenoxyacetic acid, dialkylaminoacetic acid, piperidinoacetic acid, succinic acid, benzoic acid, etc.

UTILITY

The novel 18-methyl-1,4-androstadienes of the above formula have valuable pharmacological properties. They are for instance distinguished by a surprisingly high ratio between anabolic main action and androgenic side effects.

The following tables illustrate the superiority of the compounds of the inventing using as examples 17β-hydroxy-17α-18-dimethyl-1,4-androstadiene-3-one (I) and comparing this compound with 17β-hydroxy-17α-methyl-1,4-androstadiene-3-one (II) and 17α-methyl-5α-androstano-(3,2-c)-1'H-pyrazol-17β-ol (Androstanazol) (III).

The tests shown in the table were carried out with castrated male rats after oral administration employing the conventional levator ani-seminal vesicle test.

TABLE

| Test | Compound | Dose in mg. | Levator ani, weight in mg. | Seminal vesicle, weight in mg. |
|---|---|---|---|---|
| I | 17β-hydroxy-17α, 18-dimethyl-1, 4-androstadiene-3-one. | 1 | 27 | 9 |
| II | 17β-hydroxy-17α-methyl-1, 4-androstadiene-3-one. | 1 | 29 | 27 |
| III | 17β-methyl-5α-androstano-(3, 2-c)-1' H-pyrazol-17β-ol (androstanazol). | 1 | 19 | 15 |

The compounds are useful for all conditions where a build-up of the body albumin is indicated. Such conditions are for instance; convalescence, general debility, consumptive (in the broad sense) diseases, cachexia, radiation- and cytostasis therapy, anemia, extended treatments with corticoids, osteoporosis, chronic liver and kidney diseases, hyperthyreosis, muscular dystrophy, underdeveloped or dystrophic infants, abnormal growth phenomena, etc.

The compounds are suited for any type of administration, such as oral or parenteral administration, be it intramuscular or subcutaneous. The dose depends on the gravity of the illness. In general it should be between about 2 and 25 mg. per day.

PHARMACEUTICAL COMPOSITIONS

For administration the compounds of the invention can be set up in combination with the usual and conventional additives as used in galenic pharmacy for making anabolically active drugs. Examples of such compositions are the following:

Tablets containing 5 mg. of 17β-hydroxy-17α,18-dimethyl-1,4-androstadiene-3-one:

|  | Mg. |
| --- | --- |
| 17β - hydroxy - 17α,18-dimethyl-1,4-androstadiene-3-one (micronized) | 5 |
| Lactose (DAB 6) | 105 |
| Corn starch (USP XVI) | 8 |
| Magnesium stearate (USP XVI) | 1 |
| Talcum (DAB 6) | 1 |
|  | 120 |

Tablets were made in the usual manner on a tabletting machine.

They had a diameter of 7 mm. (notched) and a thickness of between 2.7 and 2.8 mm. The hardness was about 4–5 kg.

The tablets are decomposed in the gastric juice at 37° C. in about 15 seconds.

Capsules containing 1 mg. of 17β-hydroxy-17α,18-dimethyl-1,4-androstadiene-3-one.

|  | Mg. |
| --- | --- |
| 17β-hydroxy - 17α,18 - dimethyl-1,4-androstadiene-3-one (micronized) | 1.0 |
| Lactose (DAB 6) | 66.5 |
|  | 67.5 |

The composition was put up in the usual hard gelatin telescoping capsules.

PROCESS OF MAKING THE COMPOUNDS

The compounds are made by dehydrogenating a corresponding steroid that is saturated in the 1,2-position. Accordingly the starting products have the following formula:

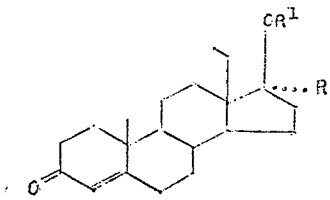

R and R¹ in this formula have the same meaning as given above. However, if R¹ is hydrogen, the free 17-hydroxy group may subsequently be acylated. On the other hand, if R¹ is a 17-acyloxy group, the main reaction may be followed by a saponification to change the acyloxy group into a hydroxy group.

The dehydrogenation is carried out by the methods which are generally used to introduce a Δ¹-double bond into a Δ⁴-3-keto steroid. For instance, chemical dehydrogenation may be effected by means of selenium dioxide or quinones such as 2,3-dichloro-5,6-dicyanobenzoquinone.

If selenium dioxide is used as the dehydrogenating agent, suitable solvents are for instance tert.-butanol, ter.-amylalcohol or acetic acid ester. The reaction can be accelerated by addition of small amounts of glacial acetic acid and is practically carried out by heating of the reaction mass upon reflux. The reaction time is between about 10 and 50 hours.

If 2,3-dichloro-5,6-dicyano-benzoquinone is employed as the dehydrogenating agent, it is preferred to carry the reaction out at the boiling temperature of the solvent, as in the previous case.

Suitable solvents are for instance: alcohols such as ethanol, butanol and tert.-butanol, acetic acid ester, glacial acetic acid, benzene, dioxane, tetrahydrofuran, etc. Small amounts of nitrobenzene or p-nitrophenol may be added to accelerate the reaction. The reaction time is between 5 and 50 hours.

The dehydration of the 1,2-position can, in addition to the use of chemical agents, also be effected by a microbiological process. The microbiological dehydrogenation can be effected by using micro-organisms, for instance of the following genuses: Calonectria, Colletotrichum, Didymella, Fusarium, Septomyxa, Vermicularia, Acetobacter, Aerobacter, Alcaligenes, Bacillus (particularly *Bacillus lentus* MB 284), Corynebacterium (particularly *Corynebacterium simplex*), Mycobacterium, Nocardia, Protaminobacter, Psuedomonas, Streptomyces, etc.

STARTING COMPOUNDS

As indicated the starting compounds have the following formula

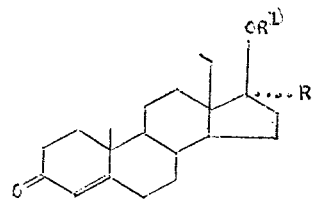

wherein R is a saturated or unsaturated lower hydrocarbon residue and R¹ is hydrogen or acyl. These starting products have not previously been described, and their making will now briefly be discussed.

For instance, 3-methoxy-17β-acetoxy-18-methyl - 1,3,5 (10),8,14-estrapentaene is first hydrogenated, then subjected to the Birch reduction, then re-acetylated in the 17-position and the thus-formed 3-methoxy-2,5(10)-17β-acetoxy compound is finally subjected to enolether splitting. The thus-obtained 17-acetoxy-18-methyl-5(10)-estrene-3-one (melting point 145–146° C.) is then reduced with sodium boron hydride in aqueous tetrahydrofuran.

The 17β-acetoxy-18-methyl-5(10)-estrene-3β-ol which is separated from the mixture of epimers is then methylenated by the Simmons and Smith method with methylene iodide and zinc-copper to form 17β-acetoxy-18-methyl-5, 10β-methylene-5β-estrane-3β-ol (M.P. 128.5–129.5° C.). The corresponding 3-ketone (M.P. 141–144° C.) is obtained by oxidation and the methylene ring of the 17β-acetoxy-18-methyl-5,10β-methylene-5β-estrane-3 - one is then split by heating of the compound in acetic acid/concentrated HCl (3:1) and the 17β-acetoxy group is finally saponified.

The resulting 17β-hydroxy-18-methyl-4-androstene - 3-one (R²=H, R¹=H; M.P. 176.5–177.5° C.) is subjected to cetalising by heating with ethylene glycol in the presence of p-toluene sulfonic acid in benzene in the 3-position and is subsequently oxidized in the 17-position by treatment with a chromic acid solution.

Depending on the desired group that should be represented by R² in the final product the resulting 3,3-ethylenedioxy-18-methyl-5-androstene-17-one (M.P. 197–200° C.) is for instance reacted with methyl magnesium iodide or lithium acetylide. After ketal splitting there is obtained 17β-hydroxy-17α,18-dimethyl-4-androstene-3 - one, M.P. 182.5–189° C. for 17β-hydroxy-18-methyl-17α-ethinyl-4-androstene-3-one, M.P. 232–234° C., respectively.

In order to make the 17α-vinyl or 17α-ethyl compound, hydrogenation of the 17α-ethinyl compound is effected prior to the ketal splitting. There is thus obtained 17β-hydroxy-18-methyl-17α-ethyl-4-androstene-3-one (132–133° C. M.P.).

If it is desired to obtain compounds of the formula above wherein R¹ is acyl, it is possible to esterify the corresponding 17β-hydroxy compound in conventional manner. To illustrate this aspect there is mentioned the reaction with acid anhydride or acid halide in the presence of an acid or basic agent as well as the reaction of the desired acid in the presence of trifluoro-acetic acid anhydride.

The following examples illustrate the making of the compounds of the invention from the just-described starting products:

EXAMPLE 1

1.25 g. of 17β-hydroxy-17α,18-dimethyl-4-androstene-3-one and 375 mg. selenium dioxide are heated upon reflux in 62.5 ml. of absolute tert.-butanol and 0.63 ml. acetic acid in a nitrogen atmosphere for 24 hours. Thereafter, 375 mg. of selenium dioxide are again added and heating is resumed for 24 hours in a nitrogen atmosphere and upon reflux. The precipitate is removed by filtration and the filtrate is concentrated in a vacuum to dryness. The residue is taken up in acetic acid ester; the solution is then washed successively with an aqueous sodium bicarbonate solution and water and is finally dried over sodium sulfate. The solvent is evaporated in a vacuum and the residue is subjected to chromatography through 100 g. of silica gel.

After gradient elution with pentane-15%-acetone and recrystallization from hexane/acetone, there are obtained 705 mg. of 17β-hydroxy-17α-18-dimethyl-1,4 - androstadiene-3-one having a melting point of 150–151° C. UV (methanol): $\epsilon_{244}=15500$.

EXAMPLE 2

In a manner analogous to that of Example 1, 800 mg. of 17β-hydroxy-18-methyl-17α-ethinyl-4-androstene-3-one are heated for 48 hours in a nitrogen atmosphere upon reflux in 40 ml. absolute ter.-butanol containing 0.4 ml. glacial acetic acid together with 2 × 250 mg. of selenium dioxide. After further treatment, as described in Example 1, chromatography through silica gel and recrystallization from hexane-acetone, there are obtained 400 mg. of 17β-hydroxy-18-methyl-17α-ethinyl-1,4-androstadiene-3 - one; M.P. 162–163° C. UV (methanol): $\epsilon_{244}=14900$.

EXAMPLE 3

This process again was analogous to that of Example 1. 800 mg. of 17β-hydroxy-18-methyl-17α-ethyl-4 - androstene-3-one were dehydrogenated in 40 ml. of abs. tert.-butanol containing 0.4 ml. acetic acid with 2× 250 mg. selenium dioxide. After corresponding treatment of the reaction mass, chromatography of the crude product through silica gel and recrystallization from diisopropyl ether, there were obtained 232 mg. of 17β-hydroxy-18-methyl-17α-ethyl-1,4-androstadiene - 3 - one, M.P. 178–181° C. UV (methanol): $\epsilon_{245}=14800$.

What is claimed is:

1. 18-methyl-1,4-androstadiene of the formula

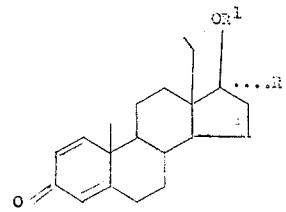

wherein R is a saturated or unsaturated lower hydrocarbon residue and $R^1$ is hydrogen or the acyl group of aliphatic carboxylic acid having 1 to 12 carbon atoms.

2. The compound of claim 1 wherein $R^1$ is the acyl group of an acid selected from the group consisting of acetic acid, propionic acid, enanthic acid, caproic acid, undecylic acid, trimethylacetic acid, chloracetic acid, dichloroacetic acid, cyclopentylpropionic acid, phenylacetic acid, phenoxyacetic acid, dialkylaminoacetic acid, piperidinoacetic acid, succinic acid, and benzoic acid.

3. The compound of claim 1, which is 17β-hydroxy-17α, 18-dimethyl-1,4-androstadiene-3-one.

4. The compound of claim 1, which is 17β-hydroxy-18-methyl-17α-ethinyl-1,4-androstadiene-3-one.

5. The compound of claim 1, which is 17β-hydroxy-18-methyl-17α-ethyl-1,4-androstadiene-3-one.

References Cited

UNITED STATES PATENTS 3,398,147  8/1968  Tohda et al. _____ 260—247.2

OTHER REFERENCES

Applezweig—Steroid Drugs, vol. I.

HENRY A. FRENCH, Primary Examiner

U.S. Cl. X.R.

260—239.55 C, 397.5; 424—243